Patented Dec. 14, 1948

2,456,556

UNITED STATES PATENT OFFICE 2,456,556

SECONDARY - ALKYL (SECONDARY) AMINO ALCOHOL ESTERS OF PARA-DIALKYL AMINO BENZOIC ACID

Arthur C. Cope, Belmont, Mass., assignor to Sharp & Dohme, Incorporated, Philadelphia, Pa., a corporation of Maryland No Drawing. Application October 6, 1945, Serial No. 620,840

9 Claims. (Cl. 260—472)

This invention relates to p-mono-alkylamino- or p-dialkylaminobenzoic acid esters of secondary-alkyl(secondary) amino-ethanols, -propanols and -butanols, which esters are useful as local anesthetics, in general, combining high effectiveness with relatively low toxicity.

The compounds of the invention are represented by the general formula

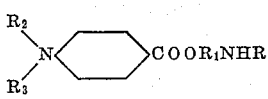

in which R represents a secondary alkyl group attached to the amino nitrogen and $R_1$ represents the alkylene group having two, three or four carbon atoms or, in other words, the divalent aliphatic residue of the ethanol, propanol or butanol, $R_2$ is an alkyl group of less than 5 carbon atoms, such as the methyl, ethyl, propyl, isopropyl, butyl, isobutyl, and secondary butyl groups, and $R_3$ is selected from hydrogen and an alkyl group of less than 5 carbon atoms of the type exemplified for $R_2$.

Thus, it is seen that both the alkyl substituent on the aliphatic amino group and the amino group itself are secondary, and that the secondary amino group is derived from ammonia by replacing one of its hydrogens by the secondary-alkyl substituent and a second hydrogen by the alkylene group. Accordingly, in this specification and in the claims the expression "secondary-alkyl(secondary)amino" is used to describe the alkyl-amino grouping on the ethanol-, propanol- and butanol-amine portion of the compounds of the invention and to show that the amino group is always secondary and that the alkyl substituent on the amino group is always secondary.

The secondary-alkyl substituent on the amino group of the alkylaminoalkanol portion of the compounds of the invention contains at least three carbon atoms and may be open chain as isopropyl, secondary - butyl, -pentyl, -hexyl, -heptyl, -octyl, -nonyl, and the like, or cyclic as the alicyclic groups such as cyclopentyl, cyclohexyl and the like, and the various open chain or cyclic groupings may be unsubstituted as those already mentioned or mono- or poly-substituted as with other alkyl groups such as in groups like 4-methylpentyl, 2,6-dimethylheptyl (or diisobutylmethyl) and the like as well as 3-ethylcyclopentyl, 4-methylcyclohexyl, 4-ethylcyclohexyl and the like.

The esters of the invention are prepared by suitable reaction between a p-(mono- or di-) alkylaminobenzoic acid anhydride or halide such as the acidyl chloride or bromide with the desired secondary-alkylamino-ethanol, -propanol or -butanol. In preparing the esters starting with an alkylaminoalkanol containing a non-tertiary alcohol group, the acidyl halide or anhydride of the particular acids disclosed is reacted with an addition salt of the desired alkylaminoalkanol containing the desired secondary-alkyl substituent on its amino group. An advantageous procedure for condensing the selected p-alkylaminobenzoyl compound with the salt of the aminoalkanol is to dissolve the aminoalkanol in an inert solvent such as a chlorinated lower paraffin hydrocarbon as chloroform or methylene chloride and the like and to convert it to its addition salt such as the hydrochloride by saturating the solution with dry hydrochloric acid gas, with cooling, and then to add to the solution an equal molal quantity of the acidyl halide as the acidyl chloride dissolved in an equal quantity of the same solvent, and heating the reaction mixture under reflux at 50 to 60° C., or higher, but preferably at the lower temperature range, then cooling the reaction mixture and removing the solvent under vacuum, and if the free base is desired, then treating the reaction product suspended in water with sufficient suitable alkali as sodium carbonate monohydrate to liberate the free amino ester.

The invention may be illustrated by, but not restricted to, the following examples:

*Example 1.*—*2-cyclohexylaminoethyl p-diethylaminobenzoate hydrochloride.*—A solution of 3.7 grams (0.023 mol) of 2-cyclohexylaminoethanol in 15 grams of chloroform was saturated with dry hydrogen chloride gas and rinsed into a flask containing 0.026 mol of p-diethylaminobenzoyl chloride in 15 grams of chloroform. The solution was heated in a bath at 50-60° C. for four days under a reflux condenser protected from atmospheric moisture. Then the solvent was removed by vacuum distillation while the mixture was warmed on a water bath and the residue was dissolved in a small volume of alcohol. Several volumes of water were added and the solution extracted several times with benzene, removing a large portion of the colored impurities. The aqueous solution was made alkaline with sodium carbonate and the ester was extracted with benzene. The benzene solution was washed with a small amount of water and brought to pH 5 to 6 by the addition of alcoholic hydrogen chloride. The solvent was removed by distillation and the hydrochloride was recrystallized from a mixture of alcohol and acetone. It melted at 165.5–166.5° C.

*Example 2.*—*2-(2-octylamino)ethyl p-diethylaminobenzoate hydrochloride* melting at 70–71° C. was obtained by replacing the alkylaminoalkanol of Example 1 by the molal equivalent of 2-(2-octylamino)ethanol, and recrystallizing the hydrochloride from a mixture of acetone, ether and pentane.

*Example 3.*—*2-cyclohexylaminoethyl p-dimethylaminobenzoate hydrochloride* melting at 229.5–

230° C. was obtained by replacing the p-dialkylaminobenzoyl halide of Example 1 by the molal equivalent of p-dimethylaminobenzoyl chloride, and recrystallizing the hydrochloride from dilute alcohol.

*Example 4.—1-[4-(2,6-dimethylheptyl)amino]-2-propyl p-dimethylaminobenzoate hydrochloride* melting at 154.5–155° C. was obtained by replacing the alkylaminoalkanol of Example 3 by the molal equivalent of 1-[4-(2,6-dimethylheptyl)amino]-2-propanol, and recrystallizing the hydrochloride from a mixture of acetone, ether and pentane.

*Example 5.—1-[4-(2,6-dimethylheptyl)amino]-2-propyl p-diethylaminobenzoate hydrochloride* melting at 152.5–153° C. was obtained by replacing the p-dialkylamino-benzoyl chloride of Example 4 by the molal equivalent of p-diethylaminobenzoyl chloride.

*Example 6.—1-cyclohexylamino-2-propyl p-dimethylaminobenzoate hydrochloride* melting at 223–224° C., with decomposition, was obtained by replacing the alkylaminoalkanol of Example 4 by the molal equivalent of 1-cyclohexylamino-2-propanol, and recrystallizing the hydrochloride from a mixture of ethylacetate, ether and pentane.

*Example 7.—1-cyclohexylamino-2-propyl p-diethylaminobenzoate hydrochloride* melting at 149–151° C. was obtained by replacing the p-dialkylaminobenzoyl halide of Example 6 by the molal equivalent of p-diethylaminobenzoyl chloride, and recrystallizing the hydrochloride from methyl ethyl ketone.

*Example 8.—2-cyclohexylamino-1-butyl p-dimethylaminobenzoate hydrochloride* melting at 199–199.5° C. was obtained by replacing the alkylaminoalkanol of Example 3 by the molal equivalent of 2-cyclohexylamino-1-butanol, and recrystallizing the hydrochloride from absolute alcohol and acetone.

*Example 9.—2-cyclohexylamino-1-butyl p-diethylaminobenzoate hydrochloride* melting at 171–171.5° C. was obtained by replacing the p-dialkylaminobenzoyl halide of Example 8 by the molal equivalent of p-diethylaminobenzoyl chloride.

Similarly, by replacing the p-dialkylaminobenzoyl halide in any of the above examples by the hydrohalide, for example the hydrochloride, of the selected p-monoalkylaminobenzoyl halide having an alkyl group of less than 5 carbon atoms, there is obtained the corresponding p-monoalkylaminobenzoate ester of various of the above exemplified secondary-alkyl(secondary)-amino-alcohols, such as, for example:

2-(2-octylamino)ethyl p-ethylaminobenzoate
2-(2-octylamino)ethyl p-butylaminobenzoate
1-cyclohexylamino-2-propyl p-methylaminobenzoate
1-cyclohexylamino-2-propyl p-propylaminobenzoate
2-cyclohexylamino-1-butyl p-methylaminobenzoate
2-cyclohexylamino-1-butyl p-butylaminobenzoate, and the like.

Likewise, by replacing the secondary alkyl group, represented by the element R in the general formula, by any other secondary alkyl group, particularly those having at least five carbon atoms and less than ten carbon atoms, there is obtained the p-monoalkylaminobenzoate or p-dialkylaminobenzoate ester of the corresponding secondary-alkyl(secondary)amino alcohol.

In preparing the esters starting with an alkylaminoalkanol containing a tertiary alcohol group, the desired secondary-alkylaminoalkanol having the tertiary alcohol group and containing the desired secondary-alkyl substituent on its amino group is reacted with a substantial excess such as a 50% excess of the p-monoalkylaminobenzoyl halide or p-dialkylaminobenzoyl halide or the acid anhydride to form the corresponding benzamide, that is the N-p-monoalkyl(or dialkyl)amino benzoyl derivative of the selected alkylaminoalkanol, which amide is then rearranged to the corresponding ester hydrochloride, for example, by boiling in absolute alcohol with an excess of concentrated hydrochloric acid.

Among the other secondary-alkyl(secondary)-amino-ethyl,-propyl and -butyl p-(mono- or di-)alkylaminobenzoates, with either or both alkyl radicals of the p-(mono- or di-)alkylaminobenzoate group being of the type exemplified for $R_2$ and $R_3$ above, included in the invention and having local anesthetic use are the benzoates obtained with other secondary-alkylaminoalkanols containing a non-tertiary alcohol group according to the procedure of Examples 1 through 9 such as:

2-cyclopentylamino-1-butyl p-dialkylaminobenzoate
2-(4-methylcyclohexyl)amino-1-butyl p-dialkylaminobenzoate
2-(3-pentylamino)-1-butyl p-dialkylaminobenzoate
2-(4-heptylamino)-1-butyl p-dialkylaminobenzoate
2-(5-nonylamino)-1-butyl p-dialkylaminobenzoate
2-cyclohexylamino-2-methyl-1-butyl p-dialkylaminobenzoate
2-(3-pentylamino)-1-propyl p-dialkylaminobenzoate
2-(4-heptylamino)-1-propyl p-dialkylaminobenzoate
2-(5-nonylamino)-1-propyl p-dialkylaminobenzoate
2-[4-(2,6-dimethylheptyl)amino]-1-propyl p-dialkylaminobenzoate
2-sec.-butylamina-2-methyl-1-propyl p-dialkylaminobenzoate
2-(2-heptylamino)-2-methyl-1-propyl p-dialkylaminobenzoate
2-cyclohexylamino-2-methyl-1-propyl p-dialkylaminobenzoate
2-isopropylamino-2-methyl-1-propyl p-dialkylaminobenzoate
2-cyclopentylamino-2-methyl-1-propyl p-dialkylaminobenzoate
3-cyclopentylamino-1-propyl p-dialkylaminobenzoate
3-cyclohexylamino-1-propyl p-dialkylaminobenzoate
3-(3-pentylamino)-1-propyl p-dialkylaminobenzoate
3-(2-heptylamino)-1-propyl p-dialkylaminobenzoate
3-(4-heptylamino)-1-propyl p-dialkylaminobenzoate
3-(2-octylamino)-1-propyl p-dialkylaminobenzoate
3-[4-(2,6-dimethylheptyl)-amino]-1-propyl p-dialkylaminobenzoate, or the corresponding p-monoalkylaminobenzoates.

Also included are the p-(mono- or di-)alkylaminobenzoates obtained with other secondary-alkylaminoalkanols having a tertiary alcohol group such as:

1-cyclopentylamino-2-methyl-2-propyl p-dialkyl-aminobenzoate
1-isopropylamino-2-methyl-2-propyl p-dialkyl-aminobenzoate
1-(3-pentyl-amino)-2-methyl-2-propyl p-dialkyl-aminobenzoate
1-(2-heptylamino)-2-methyl-2-propyl p-dialkyl-aminobenzoate
1-(2-octylamino)-2-methyl-2-propyl p-dialkyl-aminobenzoate
1-isoproylamino-2-methyl-2-butyl p-dialkyl-aminobenzoate
1-isopropylamino-2-ethyl-2-butyl p-dialkylaminobenzoate, or the corresponding p-monoalkyl-aminobenzoates.

Also included are the p-(mono- or di-) alkyl-aminobenzoates obtained with other secondary-alkylaminoalkanols having a non-tertiary alcohol group according to the procedure of Examples 1 through 9 such as:

1-(4-methylcyclohexyl) amino-2-propyl p-dialkylaminobenzoate
1-(3-ethylcyclopentyl) amino-2-propyl p-dialkylaminobenzoate
1-(4-ethylcyclohexyl) amino-2-propyl p-dialkylaminobenzoate
1-[4-(2,6-dimethylheptyl)-amino]-2-propyl p-dialkylaminobenzoate, or the corresponding p-monoalkylaminobenzoates.

The esters of the invention are thus prepared from a wide variety of secondary-alkyl(secondary)amino-alkanols selected from the -ethanols, -propanols and the -butanols, which alkanols then include a wide variety such as the 2-secondary-alkyl(secondary)amino-1-alkanols, and 3-secondary-alkyl(secondary)amino-1-alkanols, and also 1-secondary-alkyl(secondary)amino-2-alkanols, in all of which the alkanol group is selected from the ethanol, propanol and butanol groups, which alkanol groups may contain the secondary-alkylamino grouping as the sole substituent or may contain additional substituents on the alkanol carbons, such as an alkyl radical, preferably a lower alkyl radical, on the 1-, 2- and 3- carbon atoms.

The various suitable secondary-alkyl(secondary)amino-ethanols, -propanols and -butanols advantageously may be prepared by condensing a ketone with a primary amino alcohol, with simultaneous or subsequent reduction, the mechanism of which is the formation of an intermediate alkylidene amino alcohol, or the formation of an intermediate oxazolidine or the formation of an intermediate mixture of both. Such advantageous procedure is described in my copending application Serial No. 489,499 filed June 3, 1943, now abandoned, reference to which is made for details of such procedure.

While the various examples show the preparation of the hydrochloride of the various esters, if the free base is desired instead, it is prepared by dissolving or suspending the hydrochloride in a small volume of alcohol, diluting with water and treating with an excess over the stoichiometric quantity of sodium carbonate. The liberated free base is extracted with benzene and recovered therefrom in known manner. If a salt of an acid other than hydrochloric acid is desired, then to a solution of the free base, for example, in benzene, there is added the stoichiometric quantity of the particular acid of which the addition salt is desired, and the solvent removed by evaporation, under vacuum if desired, and the desired addition salt obtained by cystallization.

The anesthetic compounds of the invention are the free amines, that is, the free bases. Ordinarily they are used in the form of addition salts, for example, as a hydrochloride, sulfate, sufamate, tartrate, glycolate or other addition salt, as the free amines or bases are quite insoluble in water. The selected salt should have sufficient solubility in water to be completely soluble in the concentrations used, usually of the order of 1% or less. The hydrochlorides and the glycolates are among those particularly therapeutically effective. The esters in which the secondary-alkyl substituent on the amino group contains less than 11 carbon atoms are particularly effective.

While these various individual illustrations of the benzoic acid esters of the invention have been separately named as a certain 2-cyclohexylamino-ethyl p-diethylaminobenzoate as in Example 1 and continuing from there through the disclosure ending with 1-[4-(2,6-dimethylheptyl)-amino]-2-propyl p-monoalkylaminobenzoate, insofar as nomenclature is concerned each of the various individual esters embraced in the invention is either a p-(mono- or di-) alkylaminobenzoic acid ester of a secondary-alkyl(secondary)amino-ethanol or of a secondary-alkyl(secondary)amino-propanol or of a secondary-alkyl(secondary)amino-butanol.

What is claimed is:

1. Esters of secondary-alkyl(secondary)amino alcohols of the general formula

(R₂)₂NC₆H₄COOR₁NHR in which R is a secondary alkyl group with less than 10 carbon atoms; R₁ is an alkylene group having 2 through 4 carbon atoms with at least 2 carbons linked in sequence between the oxygen and the nitrogen; R₂ is an alkyl group containing less than 5 carbon atoms; and the dialkyl amino group is linked to the benzene nucleus in para-position to the carbonyl group.

2. Esters of secondary-alkyl(secondary)amino alcohols, as claimed in claim 1, wherein the secondary alkyl group R has at least 5 carbon atoms.

3. Esters of secondary-alkyl(secondary)amino alcohols, as claimed in claim 1, wherein the secondary alkyl group R has at least 5 carbon atoms; and R₂ is a member of the group consisting of the methyl and ethyl radicals.

4. Esters of secondary-alkyl(secondary)amino alcohols, as claimed in claim 1, wherein R₂ is a member of the group consisting of the methyl and ethyl radicals.

5. Esters of secondary-alkyl(secondary)amino alcohols of the general formula

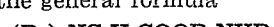
(R₂)₂NC₆H₄COOR₁NHR in which R is an open chain secondary alkyl group with less than 10 carbon atoms; R₁ is an alkylene group having 2 through 4 carbon atoms with at least 2 carbons linked in sequence between the oxygen and the nitrogen; R₂ is an alkyl group containing less than 5 carbon atoms; and the dialkyl amino group is linked to the benzene nucleus in para-position to the carbonyl group.

6. Esters of secondary-alkyl(secondary)amino alcohols of the general formula

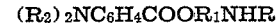
(R₂)₂NC₆H₄COOR₁NHR in which R is an alicyclic radical with at least 5 carbon atoms linked together in the cyclic nucleus and a total of less than 10 carbon atoms; $R_1$ is an alkylene group having 2 through 4 carbon atoms with at least 2 carbons linked in sequence between the oxygen and the nitrogen; $R_2$ is an alkyl group containing less than 5 carbon atoms; and the dialkyl amino group is linked to the benzene nucleus in para-position to the carbonyl group.

7. 2-cyclohexylaminoethyl p-diethylaminobenzoate hydrochloride.

8. 1-cyclohexylamino-2-propyl p-diethylaminobenzoate hydrochloride.

9. 2-(2-octylamino)ethyl p-diethylaminobenzoate hydrochloride.

ARTHUR C. COPE.

REFERENCES CITED

The following references are of record in the file of this patent:

UNITED STATES PATENTS

| Number | Name | Date |
|---|---|---|
| 1,550,350 | Eisleb | Aug. 18, 1925 |
| 2,251,996 | Goldberg (II) | Aug. 12, 1941 |
| 2,252,713 | Goldberg et al. (I) | Aug. 19, 1941 |
| 2,339,914 | Cope | Jan. 25, 1944 |